F. B. RICE.
Balanced-Valve for Steam-Engines.

No. 198,779. Patented Jan. 1, 1878.

Witnesses;
Charles E. H. Fell
Martha J. Turrell

Inventor;
Fred B. Rice

UNITED STATES PATENT OFFICE.

FRED B. RICE, OF DUNKIRK, NEW YORK.

IMPROVEMENT IN BALANCED VALVES FOR STEAM-ENGINES.

Specification forming part of Letters Patent No. 198,779, dated January 1, 1878; application filed November 30, 1877.

*To all whom it may concern:*

Be it known that I, FRED B. RICE, of Dunkirk, in the county of Chautauqua and State of New York, have invented certain new and useful Improvements in Slide-Valves for Steam-Engines, of which the following is a specification:

The object of my invention is to produce a balanced valve that can rise from its seat should undue pressure occur in the steam-cylinder, and in which the tendency to wear rounding is obviated.

Heretofore valves have been relieved of the pressure of steam by displacement-rings in the back of valve, which slide under a cover or plate, also by the reverse of this arrangement. Others have been relieved by plates, which are, in turn, balanced by flexible disks to which they are connected. Others have been relieved by strong plates placed over the valve, and resting upon pieces outside of valve, which pieces receive the pressure, thereby relieving the valve. Such plates are liable to be sprung by high pressures, thereby causing great friction on the valve, and valves thus balanced do not rise without the most excessive pressure in the parts.

On all the valves except the latter there is a pressure equal to the preponderance of pressure necessary to keep the valve to its seat in all its positions, which is necessarily a little in excess of the pressure over one port. In oil-well engines this would cause serious trouble at times, as it would interfere with reversing from a distance. It also tends to wear the valve rounding, as this preponderance of pressure is resisted alternately by pressure in the ports at each end of valve.

In my invention the defects of the different modes of balancing mentioned above are obviated by combining and modifying the two general methods, as shown in the accompanying drawings.

Figure 1:
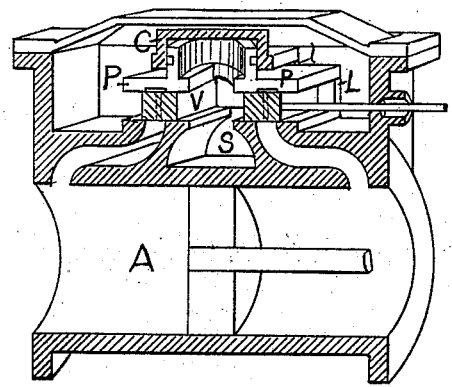
Figure 2:
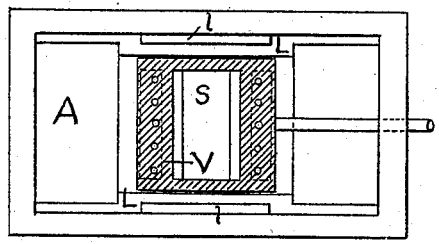
Figure 3:
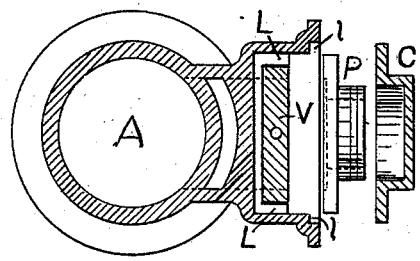
Figure 4:
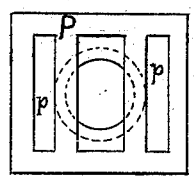
Figure 5:
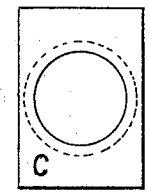

Figure 1 is a perspective view, showing the principal features of the invention. Fig. 2 is an interior view of steam-chest, showing valve in position. Fig. 3 is a cross-section through cylinder, showing end of valve, and views of plate P and cylindrical cap-plate C. Fig. 4 shows face of plate P. Fig. 5 shows cylindrical cap-plate C.

The cylinder A has a steam-chest quite similar to the common chest, the difference being the addition of the ledges L L, which are planed off even with the back of valve, for supporting the plate P, and the ledges *l l*, to which is fastened the cover C.

The valve V is a simple frame of sufficient thickness for attaching the stem. The face and back are exactly alike, as are also the faces of plate P and the valve-seat.

The plate P has a central opening entirely through it, while *p p* are shallow recesses opposite the ports in the cylinder. On the back of the plate is cast a ring, which fits the cylindrical cap-plate C, and is suitably packed to prevent leakage of steam. The area of cylindrical cap-plate C is a little greater than that of the central opening through valve V, plus the area of one steam-port.

The valve has holes through it over each port, which afford communication between the port and its corresponding recess in plate P after the valve has closed, thus preventing unequal pressures on opposite sides.

The ledges L L support plate P, while the valve is nicely fitted even with them, and eased sufficiently to allow of easy shifting under the plate, when the latter is firmly held against the ledges by steam-pressure.

The operation of the device is as follows: Steam being admitted to the space S, it fills the interior of the valve V, and, passing through plate P, it fills the cylindrical cap-plate C, which, presenting a larger area than the openings under plate P, enables the steam to press the valve to its seat and the plate to its ledges. The ledges L L fill the twofold purpose of preventing any pressure coming upon the valve, and arresting the alternate tipping tendency of the plate, as the valve moves from end to end of its travel.

The steam, after performing its work in the cylinder A, is exhausted outside the valve into the steam-chest, and thence carried away by suitable pipes.

The advantages of this arrangement are plain. The valve moves free from pressure and wears straight. It can rise readily without straining cylinder-heads, and relieve any undue pressure from water or steam in compression. In case of leakage or wear the ledges can be scraped and plate lowered onto valve, thereby making a closer joint. The steam can be admitted outside the valve, in the usual way on old cylinders, by reducing the area of displacement-ring; but on new engines it is preferably admitted as shown, saving the cover-joint and stuffing-box from the higher pressure, and keeping the exhaust steam away from the cylinder.

The faults of the old displacement-ring system—i. e., tipping and failure of perfect balance—are met by the ledges L L, while the faults of the ledge-and-plate system—i. e., liability under heavy pressure to spring and pinch the valve, and the danger to cylinder-heads from the enormous weight to be lifted when necessary to relieve the cylinder when water is shut in, are met by the displacement-ring, which relieves the plate of the bulk of its load.

I do not claim the invention of displacement-rings, nor of plates resting on supports outside of valve; but

I claim as my invention—

The cylindrical cap-plate C and plate P, having an annular ring upon its upper side, in combination with a valve and a steam-chest having ledges L L $l$ $l$, as and for the purpose set forth.

FRED B. RICE.

Witnesses:
C. M. REED,
A. D. MILLER.